United States Patent [19]

Aya et al.

[11] 4,299,945
[45] Nov. 10, 1981

[54] THERMOPLASTIC POLYAMIDE IMIDE COPOLYMERS AND METHOD OF PREPARATION

[75] Inventors: Toshihiko Aya; Takashi Sasagawa; Sho Kadoi, all of Nagoya, Japan

[73] Assignee: Toray Industries, Inc., Tokyo, Japan

[21] Appl. No.: 133,854

[22] Filed: Mar. 25, 1980

[30] Foreign Application Priority Data

Mar. 28, 1979 [JP] Japan .................................. 54-35503

[51] Int. Cl.$^3$ ............................................. C08G 69/32
[52] U.S. Cl. .................................... 528/126; 528/128; 528/173; 528/179; 528/182; 528/185; 528/188

[58] Field of Search ............... 528/126, 128, 173, 179, 528/182, 185, 188

[56] References Cited

U.S. PATENT DOCUMENTS 3,748,304  7/1973  Stephens .............................. 528/210
3,920,612 11/1975  Stephens .............................. 528/188
4,016,140  4/1977  Morello ............................... 528/350

Primary Examiner—Maurice J. Welsh
Attorney, Agent, or Firm—Miller & Prestia

[57] ABSTRACT

Thermoplastic polyamide imide copolymers are provided which are excellent in both heat stability and melt viscosity characteristics at a temperature of from about 300° C. to about 400° C., and method of preparation.

16 Claims, No Drawings

THERMOPLASTIC POLYAMIDE IMIDE COPOLYMERS AND METHOD OF PREPARATION

BACKGROUND OF THE INVENTION

1. Field of the Invention

This invention relates to heat-resistant thermoplastic copolymers, and more specifically to injection moldable polyamide imide resins excellent in both heat stability and melt viscosity characteristics at a temperature of from about 300° C. to about 400° C.

2. Description of the Prior Art

It is well known that an aromatic polyamide imide, excellent in heat resistance, is obtained by the polycondensation of an aromatic tricarboxylic acid anhydride or derivative thereof and an aromatic diamine or derivative thereof. However, the aromatic polyamide imides which have been previously proposed are not necessarily satisfactory for use as melt molding materials because of lack of total balance of thermal stability at melt molding, melt viscosity at melt molding, and the mechanical characteristics of the melt molded articles.

For example, U.S. Pat. No. 3,920,612 discloses a polyamide imide polymerized from trimellitic acid chloride anhydride and 4,4'-diaminodiphenyl ether as shown by the formula

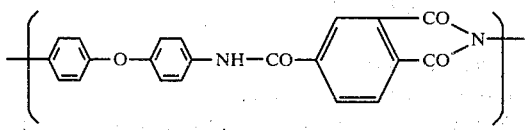

which is excellent in heat resistance but in practice, cannot be melt molded because the fluid starting point and the thermal decomposition point of the polyamide imide are too close.

Polyamide imides polymerized from trimellitic acid anhydride and 4,4'-diaminodiphenylemthane or m-phenylenediamine as shown by the formulae

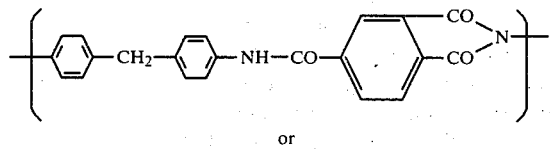

or

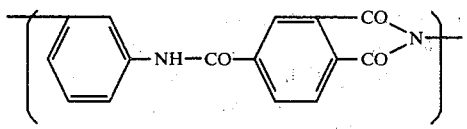

as in, for example, U.S. Pat. No. 4,016,140 have thermal decomposition points of less than 300° C., and melt molding of them is considerably difficult because their heat resistance is not satisfactory, and still further, the fluid starting points and the thermal decomposition points are too close. Even if they could be molded, the molded articles obtained would have very poor mechanical characteristics.

Japanese Kokai 74-129,799 discloss a polyamide imide polymerized from trimellitic acid chloride anhydride and 4,4'-sulfonylbis-(p-phenyleneoxy)dianiline as shown by the formula

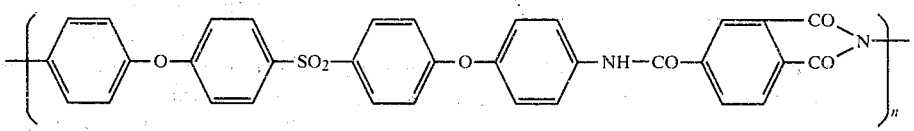

This polyamide is excellent in melt molding because the difference between the fluid starting point and the thermal decomposition point is more than 50° C. and the thermal stability and melt viscosity at melt molding are also excellent. However, the flexibility of the diamine unit is so large that the properties of the molded articles, particularly the heat distortion temperature, do not attain satisfactory levels.

In order to eliminate the drawbacks of the known polyamide imides, copolymerization of trimellitic acid chloride anhydride and two different kinds of diamines has been proposed in, for example U.S. Pat. No. 3,748,304. But, the combinations of two kinds of diamines as shown in this patent are of five different systems, as follows:

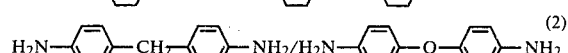

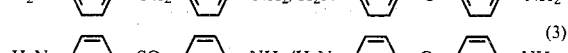

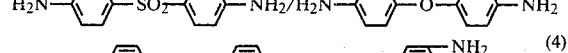

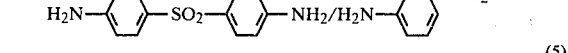

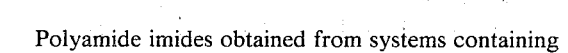

Polyamide imides obtained from systems containing

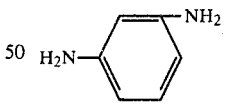

or

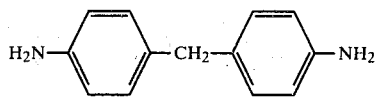

are of inferior thermal stability and show a decline in thermal stability in proportion to the content of these diamines, so that these polyamide imides are not satisfactory as melt molding materials. Furthermore, the system containing

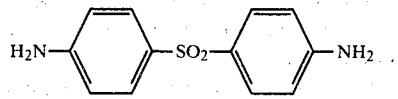

poses a big obstacle to efficiency of production of the polymer because of the low polymerization activity of

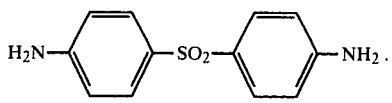

In any event, the copolymers obtained utilizing the above systems are not altogether satisfactory in practice.

Therefore, it is a primary object of the present invention to provide a melt moldable aromatic polyamide imide which is excellent in heat resistance, mechanical characteristics and electrical characteristics.

SUMMARY OF THE INVENTION

This invention relates to a novel class of polyamide imides obtained by the reaction of an aromatic tricarboxylic acid or derivative thereof with a mixture of more than two special kinds of primary aromatic diamines, and more specifically relates to polyamide imides obtained by the polycondensation of an aromatic tricarboxylic acid or derivatives thereof (A), a primary aromatic diamine having an arylether bond (B) and a special aromatic diamine having an arylether bond and more than four benzene rings (C).

The present invention provides a copolymer consisting essentially of

Unit A

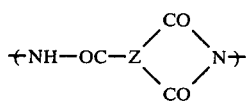

in an amount of about 50 mole %,

Unit B

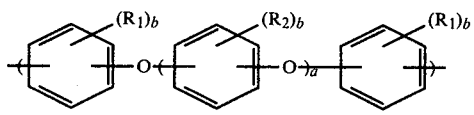

in an amount of from about 15-48 mole %, and

Unit C

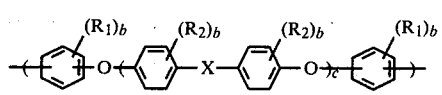

in an amount of from about 35-2 mole %, and wherein

Z is a trivalent aromatic group having two of its three carbonyl groups attached to adjacent carbon atoms;

a is 0 or 1, b is 0, 1, 2, 3, or 4, $R_1$ is alkyl having 1-4 carbon atoms, $R_2$ is a substituent selected from the group consisting of alkyl having 1-4 carbon atoms, halo and nitro, c is an integer from 1 to 25, and X is a member selected from the group consisting of
—$SO_2$—,

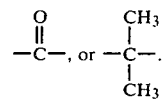

In the preparation of the copolymers of the present invention, direct polymerization is carried out by the heat polymerization of aromatic diamino compounds and an aromatic tribasic carboxylic acid compound having two carboxyl groups attached to adjacent carbon atoms, and/or a derivative thereof, in an organic polar solvent in the presence of a dehydrating catalyst, wherein the aromatic diamino compounds are composed of 30-95 mole % of one or more than two kinds of diamines of the formula (I)

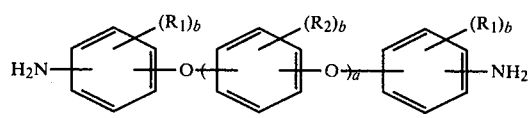

wherein a is 0 or 1, b is 0, 1, 2, 3, or 4, $R_1$ is alkyl having 1-4 carbon atoms, and $R_2$ is a substituent selected from the group consisting of alkyl of 1-4 carbon atoms, halo and nitro, and 70-5 mole % of one or more than two kinds of diamines of the formula (II)

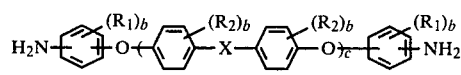

wherein b is 0, 1, 2, 3, or 4, c is an integer from 1 to 25,

X is a member selected from the group consisting of
—$SO_2$—,

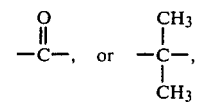

$R_1$ is alkyl of 1-4 carbon atoms, and $R_2$ is a substituent selected from the group consisting of alkyl having 1-4 carbon atoms, halo and nitro.

Also, the copolymers of the present invention are prepared by reacting 0.9-1.0 mole of a mixture of diamines composed of 30-95 mole % of one or more than two kinds of diamines of formula I above and 1.0 mole of trimellitic anhydride acid chloride in an organic polar solvent at a temperature of from −20° C. to 80° C., subsequently adding more than 0.9 mole of a hydrochloride scavenger to produce polyamide-amic acid, and then ring closing the said polyamide-amic acid by the removal of water.

DETAILED DESCRIPTION

The polyamide imides of this invention consist mainly of

Unit A

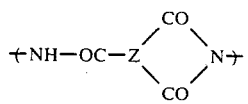

in the amount of about 50 mole %,
Unit B

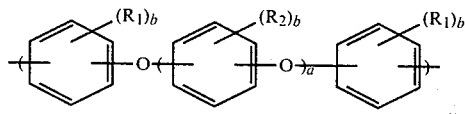

in the amount of from about 15-48 mole %, and
Unit C

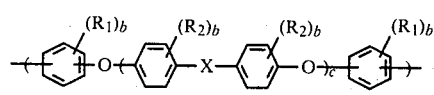

in the amount of from about 35-2 mole %.

In Unit A, Z is a trivalent aromatic group of which two of its three carbonyl groups attach to adjacent carbon atoms. As some examples of Z, the following specific structures are cited:

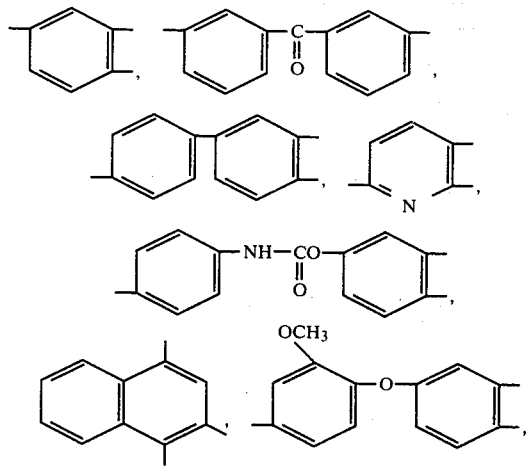

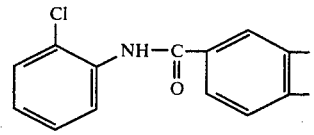

In unit B, a is 0 or 1, b is 0, 1, 2, 3 or 4, $R_1$ is alkyl having 1-4 carbon atoms, $R_2$ is a substituent selected from the group consisting of alkyl of 1-4 carbon atoms, halo and nitro.

As some examples of Unit B, the following specific structures are cited:

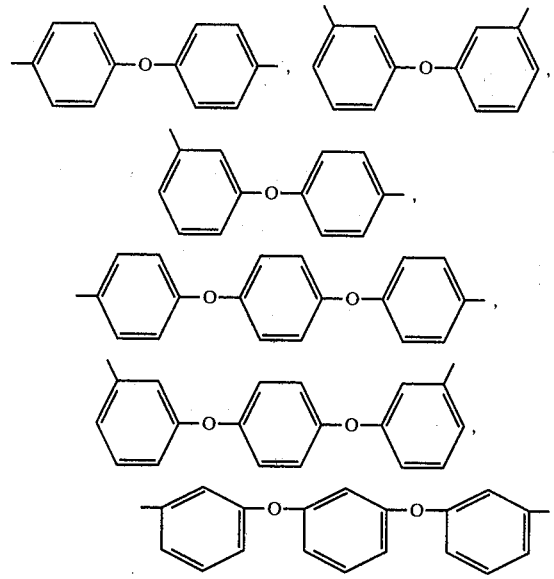

In Unit C, b is 0, 1, 2, 3 or 4, c is an integer from 1-25, $R_1$ is alkyl having 1-4 carbon atoms, $R_2$ is a substituent selected from the group consisting of alkyl having 1-4 carbon atoms, halo and nitro, and X is a member selected from the group consisting of $-SO_2-$,

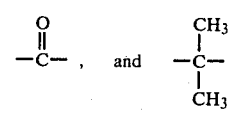

As some examples of Unit C, the following specific structures are cited:

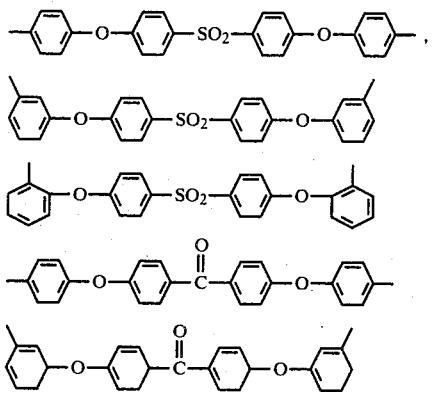

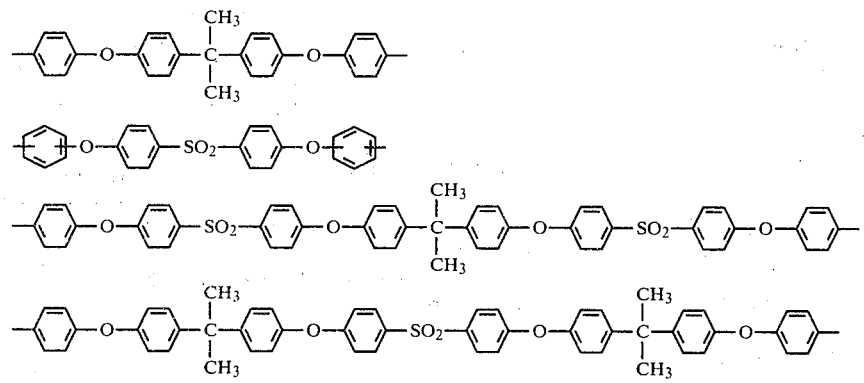

The polyamide imide of this invention consists of about 50 mole % of Unit A; 15-48 mole % of Unit B, and preferably about 25-45 mole %, and 35-2 mole % of Unit C, preferably about 25-5 mole %. It is undesirable for the amount of Unit B to be more than 48 mole % in all units, because melt molding of the polyamide imide copolymer is difficult in practice due to increase remarkably melt viscosity. And, it is undesirable for the amount of Unit B to be less than 15 mole % in all units due to reduce the heat distortion temperature of the article of the polyamide imide.

In the practice of this invention, some of the imide bonds, for example, less than 50 mole %, preferably 30 mole %, remain amide bonds as precursors for ring closure having the structure of Unit A′

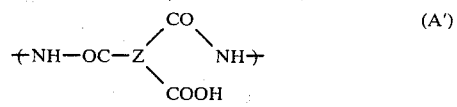

The polyamide imide copolymers of this invention can be prepared by all of the general methods which have been proposed. From these methods, the following three methods are cited as typical examples for practical use:

(1) Isocyanate method: The method of reaction of an aromatic tricarboxylic acid and/or an iminodicarboxylic acid synthesized from an aromatic tricarboxylic acid anhydride/an aromatic diamine (2/1 mole ratio), and an aromatic diisocyanate, for example as described in British Pat. No. 1,155,230 and French Pat. No. 1,473,600.

(2) Acid halide method: The method of reacting an aromatic tricarboxylic anhydride acid halide and an aromatic diamine as described, for example, in U.S. Pat. No. 3,920,612.

(3) Direct polymerization method: The method of directly reacting an aromatic tricarboxylic acid or derivative thereof, with the exception of acid halide derivatives, and an aromatic diamine in the presence of a dehydrating catalyst as described, for example, in U.S. Pat. No. 4,016,140.

Of the above-mentioned three methods, direct polymerization is the most profitable method as a process for omission of the step of previously activating a functional group in the monomer structure.

After the direct polymerization method, the acid halide method is most profitable since trimellitic anhydride acid chloride, which is a typical example of an aromatic tricarboxylic anhydride acid halide, is quite commonly used.

In direct polymerization of the copolymers of the present invention, heat polymerization of aromatic diamino compounds and an aromatic tribasic carboxylic acid compound having two carboxyl groups attached to adjacent carbon atoms and/or a derivative thereof, is carried out in an organic polar solvent in the presence of a dehydrating catalyst, wherein said aromatic diamino compounds are composed of 30-95 mole % of one or more than two kinds of diamines of the formula (I)

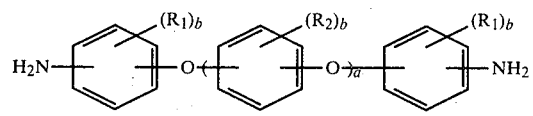

wherein
a is 0 or 1,
b is 0, 1, 2, 3 or 4,
$R_1$ is alkyl having 1-4 carbon atoms, and
$R_2$ is a substituent selected from the group consisting of alkyl of 1-4 carbon atoms, halo and nitro, and
70-5 mole % of one or more than two kinds of diamines having the formula (II)

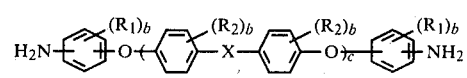

wherein
b is 0, 1, 2, 3 or 4,
c is an integer from 1 to 25,
X is a member selected from the group consisting of
—$SO_2$—

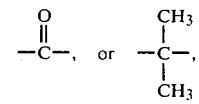

$R_1$ is alkyl having 1-4 carbon atoms, and
$R_2$ is a substituent selected from the group consisting of alkyl having 1-4 carbon atoms, halo and nitro.

The dehydrating catalyst used in this invention is a catalyst widely used in common condensation reactions, such as for example, trivalent or pentavalent organic or inorganic phosphorus compounds, lead monoxide, boric acid and boron oxide.

The above-mentioned trivalent or pentavalent phosphorus compounds are represented by the general formulae

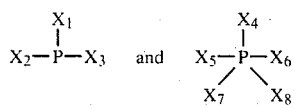

or intra- or inter- molecular condensates thereof, wherein $X_1$, $X_2$, $X_3$, $X_4$, $X_5$, $X_6$, $X_7$ and $X_8$ are members each of which is selected from the group consisting of hydrogen, alkyl of 1–15 carbon atoms, cycloalkyl of 6–20 carbon atoms, aryl having 6–20 carbon atoms, and heterocyclic radical having at least one atom of O, S, or N and having a 5- or 6-member ring on which hydroxyl, alkoxyl, aryloxyl, mercapto, amino and/or halogen radical, etc. may be substituted. Examples of these phosphorus compounds are triphenyl phosphite, tricresylphosphite, tricyclohexyl phosphite, dimethyl-m-chlorophenyl phosphite, oxyethyl dipyridyl phosphite, diethyl hydrogen phosphite, O-methyl-S,S'-diphenyl dithiophosphite, O,O'-diphenyl-N,N'-dimethylamido phosphite, N,N',N''-hexamethyl phosphorus triamide, O,O'-di-n-butyl isocyanate phosphite, tetrabutyl pyrophosphite, phenyl phosphonous acid, cyclohexyl phosphonous acid, di-n-butyl phosphinous acid, S-methyl diphenylthiophosphinite, N,N-dimethyl diphenylphosphinous amide, phenylphosphenite, O-acetyl-diethylphosphonite, diethyl phosphinous azide, 1,2-bis(diethoxy phosphinoxy)ethane, 2-methyl-1,2-oxaphosphorane, triphenyl phosphate, tri-n-butyl phosphate, ethylphenyl hydrogen phosphate, diphenyl phosphate, phosphoric acid, ethylene phenyl phosphate, pyrophosphoric acid, tetrapolyphosphoric acid, trimetaphosphoric acid, ethyl metaphosphoric acid, trionophosphate, phenyl phosphonic acid, O,O'-diphenyl P-cyclohexyl phosphonate, diphenyl phosphinic acid, triphenyl phosphine oxide, phosphorous pentoxide, metaphosphoric acid, ammonium hydrogen phosphoric acid, P-benzoylphosphonic acid, O-acetyl diphenyl phosphate, 1,2-bis(dimethyl thiophosphoryl)ethane, bis(dimethoxy phosphoryl)sulfide, 2-oxo-2-phenyl-1,3,2-dithiaphosphorane, 1-phenyl phosphorine-3-oxide or P-diethyltrimethylsilylphosphate, etc. Among these phosphorus compounds, the preferred compounds include phosphorous acid, phosphonous acid, i.e. phenyl phosphonous acid, etc., phosphoric acid, pyrophosphoric acid, phosphonic acid, i.e., phenyl phosphonic acid, etc., and alkyl of 1–7 carbon atoms, or aryl (i.e. phenyl, cresyl, etc.)-esters, and/or dialkyl of 1–7 carbon atoms, diaryl (i.e. diphenyl)-, or alkyl aryl amides thereof.

The aromatic tricarboxylic acid component used in the direct polymerization of the copolymers of this invention may consist of an aromatic benzenoid radical of 6 to 20 carbon atoms and/or a heterocyclic radical, including atoms of O, S, and/or N, etc., of which 2 to 3 rings may be joined directly or with a divalent radical of alkylene of 1–3 carbon atoms, O, S and/or sulfone, etc. Radicals such as alkoxyl, aryloxyl, alkylamino or halo, etc. may be introduced as substituents but not for participation in condensation. And, three carboxylic groups are attached directly to the above-mentioned aromatic ring, two of which are attached to adjacent carbon atoms.

Examples of these tricarboxylic acid compounds are trimelitic acid, 3,3', 4'-benzophenone tricarboxylic acid, 2,3',4'-diphenyl tricarboxylic acid, 2,3,6-pyridine tricarboxylic acid, 3,4,4'-benzanilide tricarboxylic acid, 1,3,4 naphthalene tricarboxylic acid, 2'-methoxy-3,4,4'-dipheylether tricarboxylic acid or 2'-chlorobenzanilide-3,4,4'-tricarboxylic acid, etc. Furthermore, the derivatives of the above-mentioned tricarboxylic acids such as anhydrides, esters, amides, imidecarboxylic acids and ammonium salts are useful as the aromatic tricarboxylic acid component of this invention. Examples of these derivatives are trimellitic acid anhydride, 1,3-dicarboxy-4-carbethoxybenzene, 1,4-dicarboxy-3-N,N-dimethylcarbamoylbenzene, 1,4-dicarbomethoxy-3-carboxybenzene, 1,4-dicarboxy-3-carbophenoxybenzene, 2,6-dicarboxy-3-carbomethoxypyridine, 1,5-dicarbethoxy-6-carboxynaphthalene, 1,6-dicarboxy-5-carbamoylnaphthalene, etc., and ammonium salts of the above-mentioned aromatic tricarboxylic acids such as ammonia, dimethylamine, triethylamine or methylcyclohexylamine, etc., and imidecarboxylic acids of 1:1 or 2:1 mole ratio, and adducts etc. of trimellitic acid anhydride/aromatic diamine (recommended above as a component of this invention).

In the practice of this invention trimellitic acid and trimellitic acid anhydride are most preferably used since they are less expensive and are of high reactivity.

Polar organic solvents which may be used in this invention include all solvents in which the polymer of this invention can be dissolved. Among the suitable solvents, N-substituted lactams of the formula

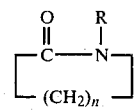

wherein R is an aliphatic or aryl group of 1–8 carbon atoms, and n is an integer of 3 to 11, and phenols are practical.

The following are some examples of the solvents used in the practice of this invention: N-methyl pyrrolidone, N-ethyl pyrrolidone, N-butyl pyrrolidone, N-ethyl piperidone, N-phenyl piperidone, N-methyl caprolactam, N-phenyl-γ-valerolactam, N,N'-ethylene dipyrrolidone, p-phenylene dipyrrolidone, phenol, cresol, xylenol, chlorophenol, quajacol, p-phenyl phenol and α- or β-naphthol etc. Of these solvents, the most preferred compound is N-methyl pyrrolidone.

The first component of the aromatic diamines used in this invention (hereinafter abbreviated as aromatic diamine (I)) has the formula

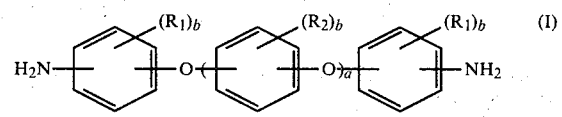

wherein
a is 0 or 1,
b is 0, 1, 2, 3 or 4,
$R_1$ is alkyl having 1–4 carbon atoms, and
$R_2$ is a substituent selected from the group consisting of alkyl of 1–4 carbon atoms, halo and nitro.

4,4'-diaminodiphenyl ether, 3,3'-diaminodiphenyl ether, 3,4'-diaminodiphenyl ether, para-bis(4-aminophenoxy)benzene, meta-bis-(3-aminophenoxy)benzene are cited as some examples of aromatic diamine (I).

The second component of the aromatic diamines used in this invention (hereinafter abbreviated as aromatic diamine (II)) has the formula

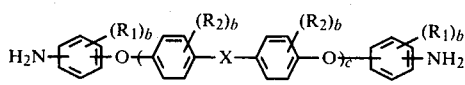 (II)

wherein
b is 0, 1, 2, 3 or 4,
c is an integer from 1 to 25,
X is a member selected from the group consisting of
—SO$_2$—,

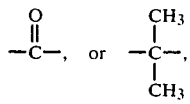

$R_1$ is alkyl having 1–4 carbon atoms, and
$R_2$ is a substituent selected from the group consisting of alkyl of 1–4 carbon atoms, halo and nitro.

As examples of aromatic diamine (II), the following formulae are cited:

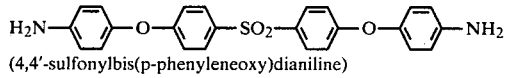
(4,4'-sulfonylbis(p-phenyleneoxy)dianiline)

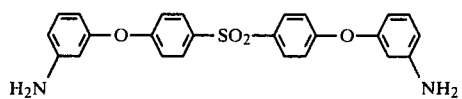
(3,3'-sulfonylbis(p-phenyleneoxy)dianiline)

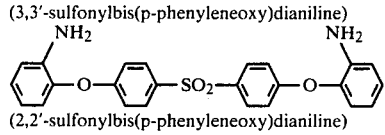
(2,2'-sulfonylbis(p-phenyleneoxy)dianiline)

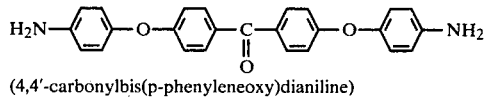
(4,4'-carbonylbis(p-phenyleneoxy)dianiline)

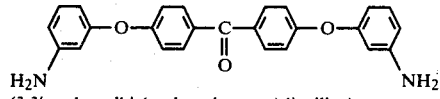
(3,3'-carbonylbis(p-phenyleneoxy)dianiline)

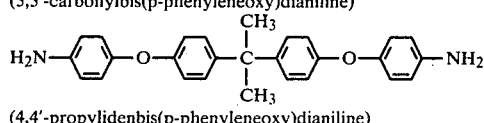
(4,4'-propylidenbis(p-phenyleneoxy)dianiline)

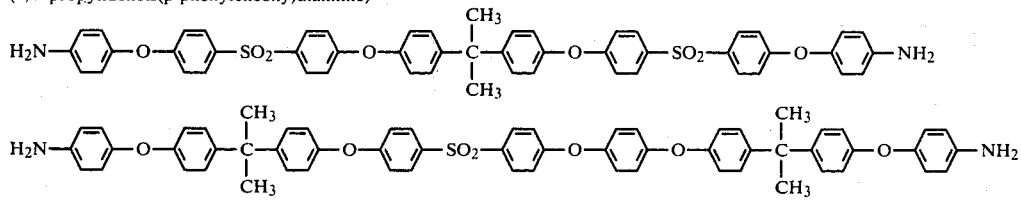

Polymerization of polyamide imide copolymers of this invention comprises addition of a polar organic solvent to the approximately equimolar mixture (a few % difference is allowed) of the aforementioned tricarboxylic acid and aromatic diamines (30–95 mole %/70–5 mol % mixture of the above-mentioned aromatic diamine (I)/aromatic diamine (II)) to form a homogeneous system and then heating the system in the presence of a dehydrating agent. In this polymerization, low concentration polymerization is possible, but it is preferable that at the initial period of polymerization, the concentration of reactants in the polymerization system be maintained at a high concentration of 50–90% by weight, preferably 55–80% by weight, in order to maintain the practical rate of polymerization.

The polyamide imide copolymer system of this invention, despite a high concentration, can be polymerized smoothly at the initial period so as not to produce insoluble intermediates. Furthermore, the polymerization system needs to be diluted gradually with additions of said solvent as the polymerization reaction progresses to obtain a soluble and meltable polyamide imide of high molecular weight. The diluting procedure is usually continued until a final concentration of 15–50% by weight, preferably 20–40% by weight, is reached, keeping the viscosity of the polymerization system relatively constant.

It is practical that this diluting solvent be added continuously or intermittently in small portions.

The mechanism of the function of the diluting procedure is not altogether clear, but the polymerization reaction is continued forcefully with the initial concentration without the phenomenon of gelation by three dimensional cross-linking occuring during the diluting procedure. It is, therefore, certain that the lowering of the mole concentration in the polymerization system by dilution with solvent causes a decrease in the number of undesirable three dimensional bonds (triamide bonds in the case of an aromatic tricarboxylic acid).

To obtain the polyamide imide copolymers of this invention, a mixture of aromatic diamine (I) of 30–95 mole %, preferably 50–90 mole %, and aromatic diamine (II) of 70–5 mole %, preferably 50–10 mole %, is used. If the amount of diamine (I) exceeds 95 mole % in the total diamine component, it is difficult to continue the polymerization to obtain a polymer of high molecular weight, because an intermediate of very poor solubility is generated and separates out under the conditions of direct polymerization of high concentrations. And, direct polymerization of low concentration, such as a constant concentration of reactants in the reaction system of 30% by weight, can produce a polyamide imide of practical molecular weight for a relatively long polymerization time of 20-50 hours, even when aromatic diamine (II) in the system exceeds 95 mole %. But, the polymer obtained from this system cannot achieve one of the primary objects of this invention because from the practical standpoint, the melt molding of it with high melt viscosity is difficult.

It is not preferable that aromatic diamine (I) be less than 30 mole % in the total diamine component, because the heat distortion temperature shows a drastic decrease.

In the reaction of the direct polymerization of polyamide imide copolymers of this invention, the dehydrating catalyst is generally added in an amount of about 0.1–15 mole %, and preferably 0.5–10 mole %, of the diamine component. If the amount of the catalyst is less than about 0.1 mole %, a practical polymerization rate cannot be attained. Furthermore, it is not preferable that the amount of the catalyst be more than about 15 mole %, because a copolymer of practical molecular weight cannot be often obtained due to the appearance of a tendency to depolymerize. The dehydrating catalyst may be added to the polymerization system either in a lump or in increments of the necessary amount, and can be added any time while polymerization has not yet been completed, but it is desirable, however, that a portion of the catalyst at least be added during the first stage of polymerization.

The direct polymerization reaction of the polyamide imide copolymers of this invention is generally performed at a temperature of 160°–350° C., preferably 210°–270° C. Volatile components such as water, alcohol, ammonia, etc., as by-products of condensation in the course of the reaction, should be distilled off. The more slowly the volatile components are distilled off, the more the polymerization rate decreases. Some of the volatile components of condensation by-products are distilled at a temperature independently of this invention, but the effect is not altogether adequate to attain a paractical polymerization rate. In that case, it is desirable that the following processes be used at the same time to accelerate the distillation of volatile components of condensation by-products:

(1) using a stream of dry inert gas such as nitrogen, carbon dioxide, helium, etc.

(2) using a reaction solvent which is distilled off little by little as the azeotropic effect, and (3) addition of an inert azeotropic solvent from the outside such as benzene, toluene, xylene or chlorobenzene, etc., causing distillation of the above-mentioned volatile components by the effective azeotropic phenomena, etc.

The copolymers of the present invention may also be prepared by (1) reacting 0.9–1.1 mole of a mixture of diamines composed of 30–95 mole % of one or more than two kinds of diamines of formula (I)

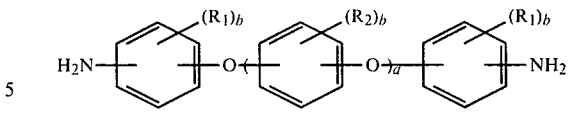

wherein a is 0 or 1, b is 0, 1, 2, 3 or 4, $R_1$ is alkyl having 1-4 carbon atoms and $R_2$ is a substituent selected from the group consisting of alkyl having 1-4 carbon atoms, halo and nitro;

70–5 mole % of one or more than two kinds of diamine of the formula (II)

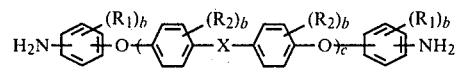

wherein b is 0, 1, 2, 3 or 4, c is an integer from 1 to 25, X is a member selected from the group consisting of $-SO_2-$,

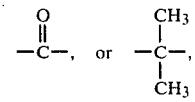

$R_1$ is alkyl having 1-4 carbon atoms, and $R_2$ is a substituent selected from the group consisting of alkyl of 1-4 carbon atoms, halo and nitro, and 1.0 mole of trimellitic anhydride acid chloride in an organic polar solvent at a temperature of from $-20°$ C. to 80° C., subsequently adding more than 0.9 mole of a hydrochloride scavenager to produce polyamide-amic acid, and (2) ring closing the said polyamide-amic acid by the removal of water.

An aromatic diamine (I) and an aromatic diamine (II) used in the preparation employing acid chloride are the same as those used in the aforementioned direct polymerization.

First of all, 1 mole of trimellitic anhydride acid chloride and 0.9–1.1 moles of a diamine mixture of the aromatic diamine (I)/aromatic diamine (II) (30–95/70–5 mole ratio, preferably 50–90/50–10 mole ratio) are dissolved in a polar organic solvent and mixed by stirring for about 0.5–1 hour at a temperature of $-20°$ to about 80° C. Next, the polymerization rate is promoted by addition of about 0.9–2.0 moles of a hydrochloride scavenger, then the polymerization reaction is completed over 0.5–10 hours at about room temperature. During this step, most of Unit A (for example 50–100%) of the polyamide imide copolymers of this invention is converted into amide-amic acid unit

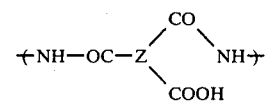

of the ring closure precursor polyamide amic acid. The polar organic solvents used in the first process are N,N-dialkylcarboxyl amides such as N,N-dimethylacetamide, N,N-dimethylformamide, etc., hetrocyclic compounds such as N-methylpyrrolidone, tetrahydrothiophen-1,1-dioxide, etc., or phenols such as cresol, xylenol, etc., and especially preferable are N-methylpyrrolidone or N,N-dimethylacetamide.

Examples of hydrochloride scavengers added during the above-mentioned process are aliphatic tertiary amines such as trimethylamine triethylamine, tripropylamine, tributylamine, etc., cyclic organic bases such as pyridine, lutidine, collidine, quinoline, etc., inorganic bases such as alkali metal hydroxide, alkali metal carbonate, alkali metal acetate, alkaline earth oxide, alkaline earth hydroxide, alkaline earth carbonate, alkaline earth acetate, etc., or organic oxide compounds such as ethyleneoxide, propyleneoxide etc.

The polyamide-amic acid obtained in the above-mentioned process is subsequently converted into a polyamide imide copolymer of this invention by a dehydration ring closure which is performed by either a liquid phase ring closure in solution or by a solid phase heat ring closure.

The liquid phase ring closure is divided into two kinds, that is, a liquid phase chemical ring closure using a chemical dehydrating agent and a simple liquid phase heat ring closure.

The chemical ring closure method is performed by using a chemical dehydrating agent, that is, an aliphatic anhydride such as acetic anhydride, propionic anhydride, etc., a halogen compound such as $POCl_3$, $SOCl_2$, etc., molecularsive, silica gel, $P_2O_5$, $Al_2O_3$, etc., at a temperature of 0°-120° C. (preferably 10°-60° C.).

The liquid phase heat ring closure method is performed by heating the polyamide amic acid solution at a temperature of 50°-400° C. (preferably 100°-250° C.). In this case, simultaneous use of an azeotropic solvent, useful for removal of water, such as for example, benzene, toluene, xylene, chlorobenzene, etc., with heating is more effective.

A solid phase heat ring closure is performed by first isolating a polyamide amic acid polymer from the polyamide amic acid solution obtained in the first process and then heat treating it in the solid state. A liquid such as water, methanol, etc., which is micible with the solvent of the reaction mixture, but in which the polyamide-amic acid is insoluble, is utilized as the precipitant for the isolation of the polyamide-amic acid polymer.

The conditions of heat treatment are generally from 150°-350° C. and 0.5-50 hours to attain the desired ring closure rate and melt viscosity. It should be noted that the polymer itself shows the lowering tendency of fluidity at melting to form the three dimensional cross-linking structure when heat treated at a temperature of 250°-350° C. for too long a period of time.

The desired polyamide imide copolymers of this invention may be obtained by the above-mentioned preparation method and furthermore, it is possible that other copolymerization components, except components consisting of Unit A, Unit B and Unit C, may be used at the same time and copolymerized.

Examples of these components are aromatic tetracarboxylic acids, aromatic dicarboxylic acids, aromatic aminocarboxylic acids, and derivatives thereof, etc.

The properties of the polymers of this invention can be variously modified by copolymerization of the above-mentioned components with respect to strength, elongation, abrasion, endurance in folding, adhesion, solubility, processability, etc. These additional copolymerizing components consist of aromatic benzenoid radicals having 6-20 carbon atoms and/or heterocyclic radicals, including atoms of O, S, and/or N, etc., and radicals such as hydroxyl, alkoxyl, alkylamine or halogen, etc., may be introduced as substituents. Further, these acid components are useful not only as free acid but also as acid derivatives such as acid anhydride, acid chloride, ester, amide, and/or ammonium carboxylic acid salts.

Examples of these aromatic dicarboxylic and aminocarboxylic components are terephthalic acid, isophthalic acid, 4,4'-diphenyldicarboxylic acid, 4,4'-diphenylether dicarboxylic acid, 4,4'-diphenylsulfone dicarboxylic acid, dimethyl terephthalate, diethyl isophthalate, 4-chloro-dimethyl isophthalate, diphenyl terephthalate, 3-carbethoxy benzoic acid, N,N'-tetramethyl isophthalamide, trimethylammonium salt of isophthalic acid, p-aminobenzoic acid, m-aminobenzoic acid, 1-aminonaphthoic acid, 4-aminophenoxybenzoic acid, 4-(p-aminobenzyl)benzoic acid, methyl-m-aminobenzoate, phenyl-p-aminobenzoate, methyl-p-aminophenoxybenzoate, p-aminobenzene diethylamide and dimethylammonium salt of m-aminobenzoic acid, etc. These acid components can be used together with an aromatic tricarboxylic acid in an amount of less than about 50 mole %, preferably less than 30 mole %, based on the total polycarboxylic acid compounds present. Further, these amino acid compounds are able to be used together with the tribasic carboxylic acid compound and the diamino compound in an amount of less than about 50 mole %, preferably less than about 30 mole % based on the total reactants present.

It is possible that other additional aromatic diamines such as m-phenylenediamine, etc., may be added to the mixture of aromatic diamine (I)/aromatic diamine (II) and copolymerized, but the amount of these other additional copolymerizing aromatic diamines ought to be limited so as not to decrease drastically the melt processabilities and physical characteristics of the prepared polyamide imide, for example, less than 50 mole % of diamine components and preferably less than 30 mole %.

A portion of the imide bonds in the aromatic polyamide imide copolymer of this invention sometimes remains amic acid bonds of ring opening, but almost all of them are ring closure bonds.

The aromatic polyamide imide of this invention has high molecular weight and an inherent viscosity ($\eta inh$) of above 0.3, and preferably above 0.35, measured in a concentration of 0.5 weight % of polymer in N-methyl pyrrolidone solution at 30° C., and is used to make various shaped articles as follows.

After other polymers, additives, fillers and/or reinforcements etc., are added to the polyamide imide copolymer powder and dry blended as occasion arises, compression molding is carried out under conditions of a temperature of 300°-400° C. and a pressure of 50-500 kg/cm². Extrusion molding and injection molding are performed at a temperature condition of 300°-400° C. by supplying a dry blend of the polyamide imide copolymers of this invention, other polymers, additives, filler and/or reinforcements, etc., as occasion arises, or the pellet from pelletizing the dry blend by extrusion. The polyamide imide copolymers of this invention are excellent, especially in the balance of thermal stability and melt viscosity, so they are useful for extrusion molding and injection molding. The shaped articles obtained by melt molding may be post cured and show a tendency of increasing in physical strength, thereby enhancing the practical use by thermal treatment in the solid state at a proper temperature condition of between 150°-300° C.

For manufacturing film or fiber, the polymer solution is directly applied by a dry or a dry-wet casting procedure; however, the isolated polymers can also be processed in a molten state with adequate additives. As for the manufacture of laminate, a cloth or mat of glass fiber, carbon fiber, or asbestos, etc., is impregnated with the polymer solution, dried and precured by heating. The resultant product is then usually pressed at 200°–400° C. under a pressure of 50–200 kg/cm².

As for enamel, the polymer solution is directly applied after controlling the thickness by addition of the same or other kinds of solvents as the occasion arises.

The present invention will be described hereinbelow in more detail by reference to examples and comparative examples, wherein values of % are ratios and parts by weight unless otherwise specified. Further, the inherent viscosity, which is a measure of the molecular weight of a polymer, is measured in concentrations of 0.5 weight % of the polymer in N-methyl pyrrolidone solution at 30° C. The 1% thermal decomposition temperature of a polymer is measured using a thermal gavity analyzer manufactured by Rigaku Electric Limited in Japan, by maintaining in a nitrogen atmosphere a sample preliminarily heat treated at 250° C. for 2 hours and measuring the weight of the sample while heating at the ratio of 10° C./minute. Melt viscosity of the copolymer in the present examples is measured using a Melt Indexer manufactured by Toyoseiki Limited in Japan, by placing a sample, dried to an absolute dry state in advance, inside a cylinder heated at 350° C., and after 10 minutes, a load of 5.0 kg is placed thereon and the sample is extruded from a nozzle (diameter 2.1 mm$\phi$, length 8 mm), at the center of the die and the viscosity is measure.

The following examples are illustrative only, and should not be construed as limiting the scope of applicants' invention as defined in the appended claims.

EXAMPLE 1

Trimellitic acid anhydride (672 g (3.5 mole), 4,4'-diaminodiphenyl ether 457 g (2.28 mole), 3,3'-sulfonylbis(p-phenyleneoxy)-dianiline 527 g (1.22 mole) and N-methyl-2-pyrrolidone (hereinafter abbreviated as NMP) 710 g (after adjusting the initial concentration of reactants in the total mixture to 70% by weight) were placed in a 5 l capacity glass separable flask equipped with a stirrer, a thermometer, a torque meter, nitrogen gas inlet tube, a distillation condenser via a Vigreux column and an inlet for an additional solvent and heated until the inside temperature reached 200° C. under a stream of dry nitrogen and stirring at a ratio of 90 rpm. Then, the resulting water by condensation was distilled off slowly. When the amount of the water by condensation reached 100 g, 12.1 g of about 85% phosphoric acid (0.105 mole in purity) was added, and heated to an inside temperature of 235° C. and stirring was continued. Then, the polymerization reaction proceeded gradually and the value of the torque meter rose to 3.0 kg/cm. At this point, addition of NMP was begun and the polymerization system was diluted to suppress the rise of the torque and maintain it at 3.0 kg/cm. At the same time, the polymerization process was performed by a portion of NMP in the polymerization system being distilled off continuously little by little to promote the distillation of the water by condensation. When these processes were continued for 3 hours and the polymer concentration in the polymerization system was down to 48%, 12.1 g of about 85% phosphoric acid (0.105 mole in purity) was added. And, when the above-mentioned processes were continued for another 5 hours and the polymer concentration in the polymerization system was down to 38%, the polymerization reaction was stopped by addition of NMP 1,100 g and anhydrous sodium carbonate 22.3 g (0.21 mole). In succession, the polymerization solution at high temperature was poured gradually into the vigorously stirred water, whereupon precipitation of the polymer as granules took place. Next, the precipitated polymer was ground to a fine powder by a grinder mill, washed/dehydrated well, and dried at 150° C. for a day and night in a circulating air oven. About 1.5 kg of the polymer powder having an inherent viscosity of 0.50, were obtained. The 1% thermal decomposition temperature of this polymer was as high as 412° C.

Then, after addition of ethylene tetrafluoride resin ("Afronpolymist F-5", manufactured by Asahi Glass Co. Ltd. in Japan) 0.5% and titanium oxide 0.5% as an anti-scorching agent to the obtained polymer powder, the blended polymer was placed in an extruder. Uniformly blended pellets of the polymer were obtained by melt kneading in the extruding through a 30 mm$\phi$ extruder (treating temperature: 340°–360° C.) equipped with a screw having a compression ratio of 2.0/1. The melt viscosity of this pellet was $35 \times 10^3$ poise and this value was a practical level for a melt molding resin.

Then, the above-obtained pellets were subjected to an ordinary injection molding machine (barrel temperature: 350°–370° C., mold temperature: 150°–200° C., injection pressure: 1,250–1,500 kg/cm²) to produce shaped samples. When the physical characteristics of these samples were measured, the results were excellent as shown in the following Table 1.

TABLE 1

| | |
|---|---|
| Flexural strength (kg/cm²) (ASTM D 790) | 1,050 |
| Flexural modulus (kg/cm²) (ASTM D 790) | 33,000 |
| Izod impact strength (kg-cm/cm) (¼", ASTM D 256) | 15 |
| Heat distortion temperature (°C.) (18.56 kg/cm², ASTM D 648-56) | 228 |

EXAMPLE 2

The polymerization process and the post-treatment process were performed as in Example 1, except trimellitic acid anhydride 672 g (3.5 mole) was replaced by trimellitic acid 735 g (3.5 mole) or trimellitic acid monomethyl ester 784 g (3.5) mole. The polymerization proceeded smoothly. Polymers with inherent viscosities of 0.48 and 0.46, respectively, were obtained. The characteristics of melt kneading of the polymers above-mentioned under these conditions were as excellent as those of Example 1.

EXAMPLES 3 AND 4

The polymerization process and the post-treatment process were performed as in Example 1 except using 4,4'-diaminodiphenyl ether 561 g (2.80 mole)/3,3'-sulfonylbis(p-phenyleneoxy)dianiline 302 g (0.70 mole), or 4,4'-diaminodiphenylether 280 g (1.4 mole)/3,3'-sylfonylbis(p-phenyleneoxy)dianilin 907 g (2.1 mole) (For Example 4) as the mixture of aromatic diamines. Polymers with inherent viscosities of 0.44 and 0.55, respectively, and excellent thermal stabilities such as 1% thermal decomposition temperatures of 418° C. and 412° C., respectively, were obtained.

Next, shaped samples were made through blended pelletizing/injection molding as in the latter part of Example 1. When the physical characteristics of these samples were measured, the results obtained were excellent as shown in the following Table 2.

TABLE 2

|  | Example 3 | Example 4 |
|---|---|---|
| Melt viscosity (poise) | 170 × 10³ | 16 × 10³ |
| Flexural strength (kg/cm²) | 1,160 | 720 |
| Flexural modulus (kg/cm²) | 35,000 | 29,000 |
| Izod impact strength (kg-cm/cm) | 18 | 11 |
| Heat Distortion temperature (°C.) | 237 | 217 |

COMPARATIVE EXAMPLE 1

The polymerization reaction was started as in Example 1 except using singly 4,4'-diaminodiphenyl ether 701 g (3.5 mole) as a component of the aromatic diamine. Then, in the early stage of the polymerization, a large quantity of heterogeneous precipitate was generated in the reaction system and the polymerization process could not be continued.

Furthermore, when para-bis(4-aminophenoxy)benzene 1,022 g (3.5 mole) or meta-bis(4-aminophenoxy)benzene 1,022 (3.5 mole) were used singly, heterogeneous precipitates were also generated and a normal polymerization process could not be carried out.

COMPARATIVE EXAMPLE 2

Trimellitic acid anhydride 672 g (3.5 mole), 4,4'-diaminodiphenyl ether 700 g (3.5 mole), NMP 2,400 g and about 85% phosphoric acid 20.2 g (0.175 mole in purity) were placed in the same apparatus as in Example 1 and the reaction mixture was heated to 200° C. for the inside temperature under a stream of nitrogen and stirring at a ratio of 90 rpm. Then, the resulting water by condensation was distilled off slowly. When the amount of the water by condensation reached about 70 g and the rate of distillation become slower, the inside temperature was raised to 215° C. and a continuous addition process of chlorobenzene as an azeotropic agent was begun. Thereafter, the polymerization process was continued for 16 hours with stationary distillation of chlorobenzene. Finally, the value of the torque meter rose to 1.5 kg/cm. At this point, the polymerization reaction was stopped by addition of anhydrous sodium carbonate followed by the post treatments as in Example 1. About 1.2 kg of the polymer powder with an inherent viscosity of 0.52 was obtained.

The obtained polymer powder was put through the blending process and the melt kneading process at 340°-360° C. as in Example 1, but this polymer powder did not show melt characteristics at all, and operation of the extruder was impossible. Further, the temperature of the kneading was elevated up to 400°-420° C. which was near the thermal decomposition temperature of the polymer, and homogeneous melt kneading characteristics could not be seen. These phenomena showed that the aromatic polyamide imide consisting of 2 units of

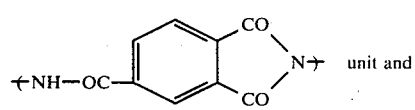 unit and

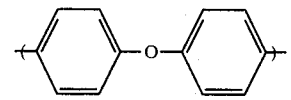

unit was not at all suitable for a melt molding material.

COMPARATIVE EXAMPLE 3

The polymerization reaction was utilized as in the first half of Example 1, except using 4,4'-diaminodiphenyl ether 457 g (2.28 mole)/3,3'-diaminodiphenyl sulfone 303 g (1.22 mole) as the component of the diamines. But, though the polymerization time from the addition of phosphoric acid catalyst was extended to more than 20 hours, the inherent viscosity of the polymer was only 0.29. This system showed very low activity of polymerization.

COMPARATIVE EXAMPLE 4

The polymerization reaction was performed as in Example 1, except using 4,4'-diaminodiphenyl ether 457 g (2.28 mole)/4,4'-diaminodiphenylmethane 242 g (1.22 mole) as the component of the diamines. A polymer with a practical inherent viscosity of 0.61 was obtained, but the 1% thermal decomposition temperature of this polymer was as low as 350° C. When this polymer was melt kneaded by an extruder at a practical treatment temperature of 300°-360° C., a normal gut could not be obtained due to violent evolution of gas. Further, under 300° C., the melt viscosity of the polymer was so high that it could not be melt kneaded.

EXAMPLE 5

Trimellitic acid anhydride 672 g (3.5 mole), 4,4'-diaminodiphenyl ether 457 g (2.28 mole), 4,4'-sulfonyl-bis(p-phenyleneoxy)dianiline 527 g (1.22 mole), boric acid 10.8 g (0.175 mole) and N-butylpyrrolidone 710 g (after adjusting the initial concentration of reactants in the total mixture to 70% by weight) were placed in the same apparatus as Example 1, and the reaction mixture was heated to 200° C. for the inside temperature under a stream of nitrogen and stirring at a ratio of 90 rpm. Then, the resulting water by condensation was distilled off slowly. Thereafter, the value of the torque meter rose to 3.0 kg/cm, while the inside temperature was raised to 240° C. and stirring was continued. At this time, N-butylpyrrolidone was added continuously to maintain the value of the torque meter at 3.0 kg/cm. After the polymerization processes were continued for another 7 hours and the polymer concentration in the polymerization system was down to 35%, NMP 1,000 g was added to dilute the system. The polymerization solution was poured gradually into a large amount of vigorously stirred methanol, and precipitation of the polymer took place in the form of flakes. Next, after the precipitated polymer was ground to a fine powder by a grinder mill, the polymer was washed well with methanol, filtered, and dried at 100° C. for 8 hours reduced pressure. About 1.5 kg of the powder with an inherent viscosity of 0.53 was obtained. The 1% thermal decomposition temperature of this polymer was as high as 416° C.

Next, shaped samples were made by blended pelletizing/injection molding as in the latter part of Example 1. When the physical characteristics of these samples were measured, the results were excellent as shown in the following Table 3.

TABLE 3

| | |
|---|---|
| Melt viscosity (poise) | 120 × 10³ |
| Flexural strength (kg/cm²) | 1,210 |
| Flexural modulus (kg/cm²) | 38,400 |
| Izod impact strength (kg-cm/cm) | 9 |
| Heat distortion temperature (°C.) | 236 |

EXAMPLES 6 and 7

The polymerization process and the post-treatment process were performed as in Example 1 except using meta-bis(4-aminophenoxy)-benzene 511 g (1.75 mole)/4,4'-sulfonylbis(p-phenyleneoxy)dianiline 756 g (1.75 mole), or para-bis(4-aminophenoxy)benzene 511 g (1.75 mole)/4,4'-sulfonylbis(p-phenyleneoxy)dianiline 756 g (1.75 mole) (for Example 7) as a mixture of diamines and tri-n-butylphosphite (8.76 g (0.035 mole) and 2.50 g (0.01 mole) added twice) as a phosphorus compound catalyst. The polymers obtained had inherent viscosities of 0.46 and 0.48, respectively, and excellent thermal stabilities such as 1% thermal decomposition temperatures of 433° C. and 435° C., respectively. Both of these polymers were excellent in balance of thermal stability and melt viscosity at melt kneading.

EXAMPLE 8

The polymerization process and the post-treatment process were performed as in Example 1 except using 4,4'-diaminodiphenyl ether 491 g (2.45 mole)/4,4'-carbonylbis(p-phenyleneoxy)dianiline 416 g (1.05 mole) for the mixture of aromatic diamines and N,N',N''-hexamethylphosphorylamide (12.5 g (0.07 mole) and 6.27 g (0.035 mole) added twice) as a phosphorus compound catalyst. A polymer with an inherent viscosity of 0.54 and a 1% thermal decomposition temperature of 425° C. was obtained. This polymer was excellent in balance of thermal stability and melt viscosity and was capable of stable pelletizing.

EXAMPLE 9

The polymerization process and the post-treatment process were performed as in Example 1, except using 4,4'-diaminodiphenyl ether 491 g (2.45 mole)/4,4'-propylbis(p-phenyleneoxy)dianiline 431 g (1.05 mole) for the mixture of aromatic diamines and phosphoric acid 14.4 g (0.175 mole) as a phosphorus compound catalyst. A polymer with an inherent viscosity of 0.51 and 1% thermal decomposition temperature of 450° C. was obtained. This polymer was excellent in balance of thermal stability and melt viscosity and was capable of stable pelletizing.

EXAMPLE 10

The polymerization process and the post-treatment process were performed as in Example 1, except trimellitic acid anhydride 672 g (3.5 mole) was replaced by a mixture of trimellitic acid anhydride 336 g (1.75 mole)/isophthalic acid 291 g (1.75 mole). A polymer with an inherent viscosity of 0.65 and 1% thermal decomposition temperature of 405° C. was obtained. This polymer was excellent in balance of thermal stability and melt viscosity and was capable of stable pelletizing.

EXAMPLE 11

4,4'-diaminodiphenyl ether 216 g (1.08 mole), 3,3'-sulfonyl-bis(p-phenyleneoxy)dianiline 51.8 g (0.12 mole) and anhydrous N,N-dimethylacetamide 3,000 g were placed in a 5 l capacity glass separable flask equipped with a stirrer, and thermometer and nitrogen gas inlet tube and converted to a homogeneous solution by stirring. This reaction mixture was cooled to −10° C. in a dry ice/acetone bath and trimellitic anhydride acid chloride 253 g (1.2 mole) was added gradually in an amount to maintain the temperature at −10° to about −5° C. Stirring was continued for another 1 hour and then anhydrous triethylamine was added gradually in an adequate amount to maintain the temperature under 5° C. Next, the reaction temperature was raised gradually to 150° C. over a period of 3 hours. In succession, toluene was added continuously and an azeotropic mixture of toluene/water was distilled off until almost all the water had been distilled off. Then, the polymerization process was finished.

Next, the polymerization solution at high temperature was poured gradually into vigorously stirred water, whereupon precipitation of the polymer took place as granules. Then, the precipitated polymer was ground to a fine powder by a grinder mill, washed/dehydrated well, and dried at 150° C. for a day and night in a circulating air oven. About 410 g of the polymer powder with an inherent viscosity of 0.53 was obtained. The 1% thermal decomposition temperature of this polymer was as high as 415° C.

Then, after ethylenetetrafluoride resin ("Afronpolymist F-15" manufactured by Asahi Glass Co. Ltd. in Japan) 0.5% and titanium oxide 0.5% as anti-scorching agent were added to the obtained polymer powder, the blended polymer powder was placed in an extruder and uniformly blended pellets were obtained by repeating twice the process of melt kneading in, and extruding through, a Brabender Plast-graph extruder. The melt viscosity of this pellet was 210×10³ poise, which is a practical level for a melt molding resin.

Subsequently, samples of the obtained blended pellets were prepared by compression molding at a temperature of 330°–350° C. and a pressure of 50–100 kg/cm². The heat distortion temperature (ASTM D 648-56, 18.6 kg/cm² loaded) of these samples was excellent, being 245° C.

COMPARATIVE EXAMPLE 5

The polymerization process, the post-treatment process and the melt kneading process were performed as in Example 11, except 4,4'-diaminodiphenyl ether 216 g (1.08 mole) and 3,3'-sulfonylbis(p-phenyleneoxy)dianiline 51.8 g (0.12 mole) were replaced by parabis(4-aminophenoxy)benzene 350 g (1.20 mole). Then, blended pellets were obtained but these were very inferior for melt molding compared to those of Example 11 since the melt viscosity of these pellets was more than 1,000×10³ poise.

COMPARATIVE EXAMPLE 6

The polymerization process, the post-treatment process, the melt kneading process and the compression molding process (at a treatment temperature of from 290°–310° C.) were carried out as in Example 11, except 4,4'-diaminodiphenyl ether 216 g (1.08 mole) and 3,3'-sulfonylbis(p-phenyleneoxy)dianiline 51.8 g (0.12 mole) were replaced by the single compound 3,3'-sulfonylbis(p-phenyleneoxy)-dianiline 518 g (1.20 mole). The heat distortion temperature (ASTM D 648-56, 18.6 kg/cm² loaded) of this sample of 205° C. was much worse when compared to Example 11.

What is claimed is:

1. As a composition of matter, a copolymer consisting of:

Unit A having the formula

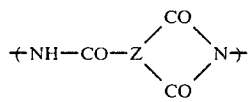

in an amount of about 50 mole %,
Unit B having the formula

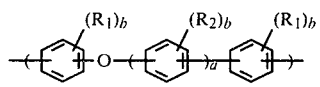

in an amount of from about 15–48 mole %, and
Unit C having the formula

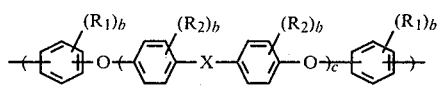

in an amount of from about 35–2 mole %,
wherein Z is a trivalent aromatic group having two of its three carbonyl groups attached to adjacent carbon atoms,
a is 0 or 1,
b is 0, 1, 2, 3 or 4,
$R_1$ is alkyl having 1–4 carbon atoms,
$R_2$ is a substituent selected from the group consisting of alkyl of 1–4 carbon atoms, halo and nitro,
c is an integer from 1 to 25, and
X is a member selected from the group consisting of $-SO_2-$, $$-\overset{O}{\underset{\|}{C}}-, \text{ or } -\overset{CH_3}{\underset{CH_3}{\overset{|}{C}}}-.$$

2. The copolymer of claim 1 wherein Z of Unit A has the structure

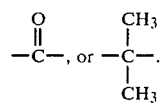

and
Unit C has the structure

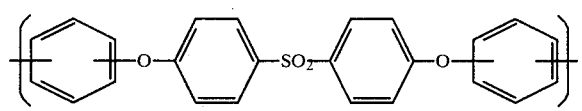

3. The copolymer of claim 1 wherein Z of Unit A has the structure

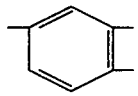

and
Unit B has the structure

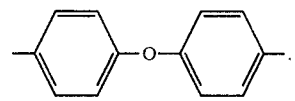

4. The copolymer of claim 1 wherein Z of Unit A has the structure

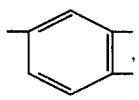

Unit B has the structure

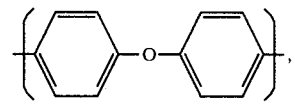

and
Unit C has the structure

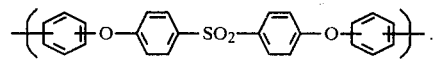

5. The copolymer of claim 1 wherein Unit A is in an amount of 50 mole %, Unit B is in an amount of from about 25–45 mole %, and Unit C is in an amount of from about 25–5 mole %.

6. A method of producing thermoplastic polyamide imide copolymers which comprises heat polymerization of aromatic diamino compounds and an aromatic tribasic carboxylic acid compound having two carboxyl groups attached to adjacent carbon atoms and/or derivative thereof, in an organic polar solvent in the presence of a dehydrating catalyst, wherein said aromatic diamino compounds are composed of from about 30 to about 95 mole % of one or more than two kinds of diamines having the formula (I)

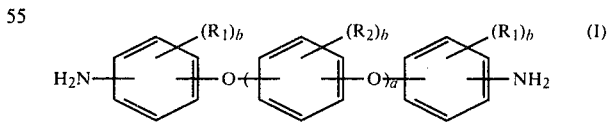

wherein
a is 0 or 1,
b is 0, 1, 2, 3 or 4,
$R_1$ is alkyl having 1–4 carbon atoms, and
$R_2$ is a substituent selected from the group consisting of alkyl of 1–4 carbon atoms, halo and nitro, and
70–5 mole % of one or more than two kinds of diamines having the formula (II)

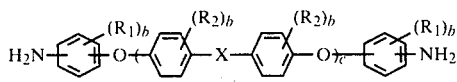 (II)

wherein
b is 0, 1, 2, 3 or 4,
c is an integer from 1 to 25,
X is a member selected from the group consisting of —SO₂—,

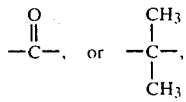

R₁ is alkyl having 1-4 carbon atoms, and
R₂ is a substituent selected from the group consisting of alkyl of 1-4 carbon atoms, halo and nitro.

7. The method according to claim 6, wherein the polymerization temperature is from about 150° to about 350° C.

8. The method according to claim 6, wherein said organic polar solvent is selected from the group consisting of an N-substituted lactam having the formula

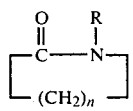

and a phenol of 6-18 carbon atoms,
wherein R is alkyl of 6-8 carbon atoms, and n is an integer from 3 to 11.

9. The method according to claim 5, wherein the polymerization reaction progresses with an initial concentration of reactants in the total mixture of from about 45-90% by weight, and then diluting said mixture with said solvent to less than 45% by weight of the concentration of the reactants.

10. The method according to claim 6 wherein said dehydrating catalyst is selected from the group consisting of trivalent or pentavalent inorganic or organic phosphorus compounds.

11. A method of producing a thermoplastic polyamide imide composition which comprises the steps of
(1) reacting 0.9-1.1 mole of a mixture of diamines composed of from about 30-95 mole % of one or more than two kinds of diamines having the formula (I)

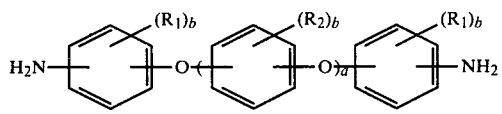 (I)

wherein
a is 0 or 1,
b is 0, 1, 2, 3 or 4,
R₁ is alkyl having 1-4 carbon atoms and
R₂ is a substituent selected from the group consisting of alkyl of 1-4 carbon atoms, halo and nitro,
70-5 mole % of one or more than two kinds of diamines having the formula (II)

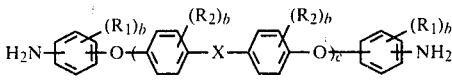 (II)

wherein
b is 0, 1, 2, 3 or 4,
c is an integer from 1 to 25,
X is a member selected from the group consisting of —SO₂—,

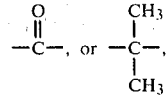

R₁ is alkyl having 1-4 carbon atoms, and
R₂ is a substituent selected from the group consisting of alkyl of 1-4 carbon atoms, halo and nitro, and
1 mole of trimellitic anhydride acid chloride in an organic polar solvent at a temperature of from −20° C. to 80° C., subsequently adding more than 0.9 mole of a hydrochloride scavenger to produce polyamide-amic acid and
(2) ring closing the said polyamide-amic acid by the removal of water.

12. The method according to claim 11, wherein said diamine (I) is from about 50-90 mole % of

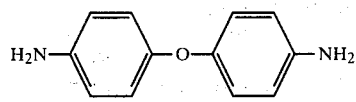

and diamine (II) is from about 50-10 mole % of

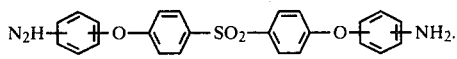

13. The method according to claim 11, wherein said organic polar solvent is one or more than two selected from the group consisting of N-methyl pyrrolidone, N,N-dimethylformamide, N,N-dimethylacetamide and phenols.

14. The method according to claim 11, wherein ring closure of said polyamide-amic acid is at a temperature of from about 150° C. to about 350° C.

15. A thermoplastic polyamide imide copolymer made according to the method which comprises the steps of
(1) reacting 0.9-1.1 mole of a mixture of diamines composed of from about 30-95 mole % of one or more than two kinds of diamines having the formula (I)

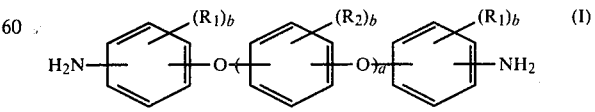 (I)

wherein
a is 0 or 1,
b is 0, 1, 2, 3 or 4,
R₁ is alkyl having 1-4 carbon atoms and $R_2$ is a substituent selected from the group consisting of alkyl of 1-4 carbon atoms, halo and nitro, 70-5 mole % of one or more than two kinds of diamines having the formula (II)

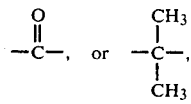   (II)

wherein
b is 0, 1, 2, 3 or 4,
c is an integer from 1 to 25,
X is a member selected from the group consisting of —SO$_2$—, $$-\overset{O}{\underset{\|}{C}}-, \text{ or } -\overset{CH_3}{\underset{CH_3}{\overset{|}{\underset{|}{C}}}}-,$$

$R_1$ is alkyl having 1-4 carbon atoms, and
$R_2$ is a substituent selected from the group consisting of alkyl of 1-4 carbon atoms, halo and nitro, and 1 mole of trimellitic anhydride acid chloride in an organic polar solvent at a temperature of from $-20°$ C. to $80°$ C., subsequently adding more than 0.9 mole of a hydrochloride scavenger to produce polyamide-amic acid and (2) ring closing the said polyamide-amic acid by the removal of water.

16. A thermoplastic polyamide imide copolymer made according to the method which comprises heat polymerization of aromatic diamino compounds and an aromatic tribasic carboxylic acid compound having two carboxyl groups attached to adjacent carbon atoms and/or derivative thereof, in an organic polar solvent in the presence of a dehydrating catalyst, wherein said aromatic diamino compounds are composed of one or more than two kinds of diamines having the formula (I)

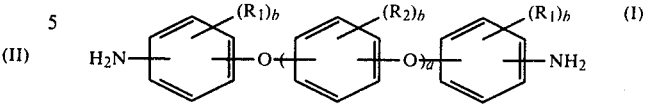   (I)

wherein
a is 0 or 1,
b is 0, 1, 2, 3 or 4,
$R_1$ is alkyl having 1-4 carbon atoms, and
$R_2$ is a substituent selected from the group consisting of alkyl of 1-4 carbon atoms, halo and nitro, and 70-5 mole % of one or more than two kinds of diamines having the formula (II)

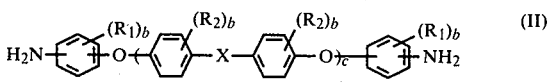   (II)

wherein
b is 0, 1, 2, 3 or 5,
c is an integer from 1 to 25,
X is a member selected from the group consisting of —SO$_2$—, $$-\overset{O}{\underset{\|}{C}}-, \text{ or } -\overset{CH_3}{\underset{CH_3}{\overset{|}{\underset{|}{C}}}}-,$$

$R_1$ is alkyl having 1-4 carbon atoms, and
$R_2$ is a substituent selected from the group consisting of alkyl of 1-4 carbon atoms, halo and nitro.

* * * * *